June 8, 1965
C. E. ENGEL
3,188,526
VOLTAGE AND POLARITY SENSING DEVICE
Filed April 28, 1961
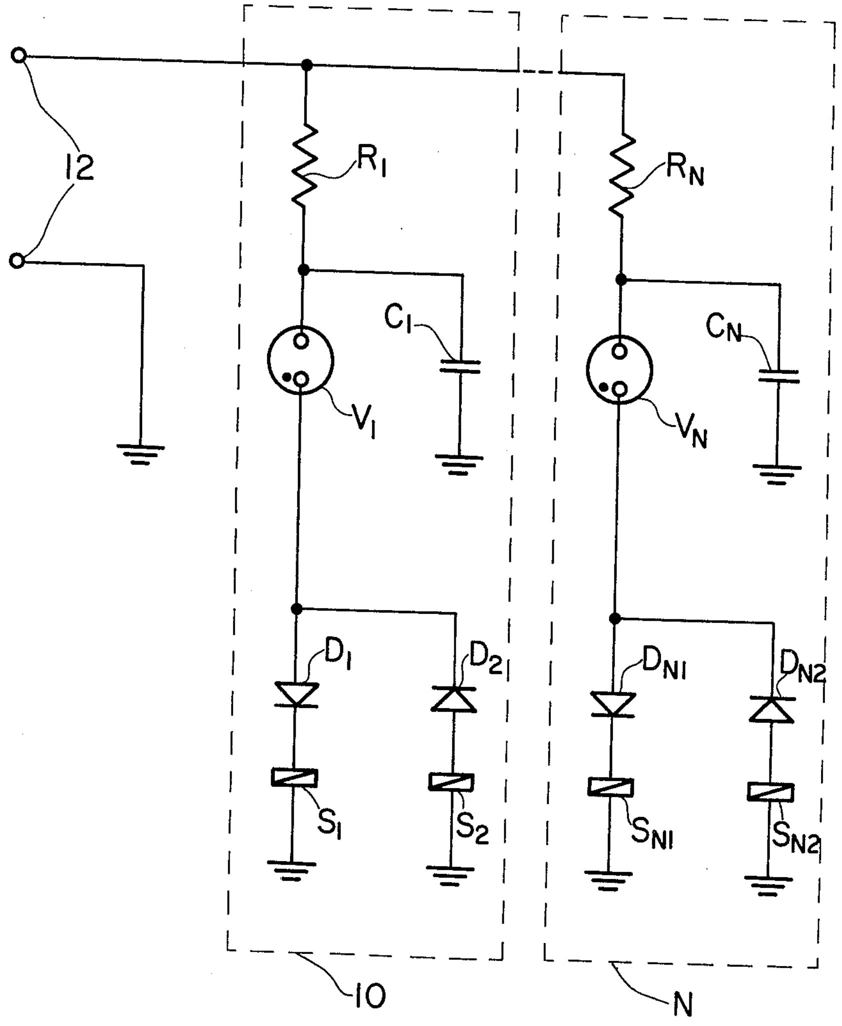
INVENTOR.
CHARLES E. ENGEL
BY
J. M. St. Amand
ATTORNEY

United States Patent Office 3,188,526
Patented June 8, 1965

3,188,526
VOLTAGE AND POLARITY SENSING DEVICE

Charles E. Engel, Upland, Calif., assignor to the United States of America as represented by the Secretary of the Navy Filed Apr. 28, 1961, Ser. No. 106,417
3 Claims. (Cl. 317—137)
(Granted under Title 35, U.S. Code (1952), sec. 266)

The invention herein described may be manufactured and used by or for the Government of the United States of America for governmental purposes without the payment of any royalties thereon or therefor.

The present invention relates to a switching circuit, and more particularly to a switching circuit where an input voltage causes switches to operate in a certain order depending upon the magnitude and polarity of the input voltage.

The invention consists of a flexible, simple and reliable electronic system which provides means for selecting one or more of a multiplicity of available functions or circuits, and which requires only differing voltage levels and/or polarities for selecting choice intelligence.

It is an object of the invention to provide a switching circuit using only differing voltage levels and/or polarities for selection intelligence.

Another object of the invention is to provide a simple and reliable switching circuit for operation over a wide range of switching values.

A further object of the invention is to provide a unique switching circuit where an input voltage causes switches to operate in a certain order depending upon the voltage magnitude and polarity.

Other objects and many of the attendant advantages of this invention will become readily appreicated as the same becomes better understood by reference to the following detailed description when considered in connection with the accompanying drawings wherein:

The figure is a circuit diagram of a preferred embodiment of the invention showing two of N number of selection capabilities.

Referring now to the drawing, it should be noted that the operation of a particular select circuit, 10 through N, is predicated on the polarity and potential of the input voltage at input terminals 12, and differentiation by voltage tubes, diodes $V_1$ and $V_N$, and polarity diodes $D_1$, $D_2$, $D_{N1}$ and $D_{N2}$. The R–C network, $R_1$–$C_1$ through $R_N$–$C_N$, is provided to assure reliable power values necessary to cause actuation of the associated switching functions.

The dashed line between select circuits 10 and N indicates that there may be N number of select circuits or selection capabilities. The number, N, of select circuits is limited only by the family of diodes, $V_1$ to $V_N$, available, each of which has a specific threshold of firing potential and are not polarity sensitive. These diodes, $V_1$ . . . $V_N$, act to discharge capacitors $C_1$ . . . $C_N$ when their firing thresholds are reached and have the inherent ability of draining approximately 95% of the charge on the capacitors.

Given an input voltage of either polarity impressed at terminals 12, capacitor $C_1$ will charge in time as a function of $R_1$. When the firing potential of $V_1$ is reached, breakdown will occur and the accumulated charge on capacitor $C_1$ will flow. The polarity of the charge will determine the polarity of current flow and thereby dictate which of the switches, $S_1$ and $S_2$, will function as differentiated by the unidirectional diodes $D_1$ and $D_2$. This operation is the same for all select circuits from 10 through N.

Assuming that $V_1$ fires at 225 volts and $V_N$ fires at 165 volts, upon application of a +250 volt potential at 12, capacitors $C_1$ and $C_N$ will begin to charge through resistors $R_1$ and $R_N$. In R–C time gas filled diodes $V_1$ and $V_N$ have reached their firing thresholds and capacitors $C_1$ and $C_N$ discharge. Because of the positive going direction of the discharge pulse diodes $D_2$ and $D_{N2}$ will effectively block the pulse, preventing switches $S_2$ and $S_{N2}$ from actuating. Diodes $D_1$ and $D_{N1}$ will pass the firing pulse and switches $S_1$ and $S_{N1}$ will actuate.

If a −175 volt potential were applied at 14, capacitors $C_1$ and $C_N$ would again charge, but in an opposite polarity sense. In R–C time diode $V_N$ reaches its firing potential and capacitor $C_N$ discharges. Because the firing potential of diode $V_1$ is 225 volts, capacitor $C_1$ cannot discharge and no action occurs in network 10. Since the direction of the discharge pulse of capacitor $C_N$ is negative, conduction occurs through diode $D_{N2}$ and only switch $S_{N2}$ will actuate. Switch $S_{N1}$ will not actuate due to the firing pulse being blocked by diode $D_{N1}$.

Obviously many modifications and variations of the present invention are possible in the light of the above teachings. It is therefore to be understood that within the scope of the appended claims the invention may be practiced otherwise than as specifically described.

What is claimed is:

1. A switching circuit for selecting at least one of a plurality of available circuits and functions comprising a pair of input terminals, one of said input terminals connected to ground, a plurality of select circuits, each of said select circuits connected between said other input terminal and ground; each said select circuit consisting of a resistor and capacitor in series connected between said input terminal and ground respectively forming an R–C network, a non-polarity-sensitive voltage diode having a specific firing threshold for detecting a desired voltage level and one side thereof connected to the junction of said resistor and capacitor in series for discharging said capacitor when the firing threshold is reached, the other side of said voltage diode connected directly to one side of a pair of unidirectional diodes such that current therefrom can flow through only one of said unidirectional diodes depending upon the polarity thereof, a switch connected between the other side of each unidirectional diode and ground operable to be actuated by current flow therethrough; the magnitude of the voltage impressed across the input terminals determining which of said plurality of select circuits will operate depending on the firing threshold of the voltage diode, the polarity of said impressed voltage determining which of said switches will actuate as differentiated by the pair of unidirectional diodes.

2. A circuit as in claim 1 wherein in each select circuit said voltage diode has the inherent capability of draining approximately 95% of the charge on said capacitor.

3. A switch circuit comprising an input terminal, a resistor and capacitor in series forming an R–C charging circuit connected between said input terminal and ground respectively, a two branch parallel circuit, each branch consisting of a unidirectional diode and a current actuated switch in series, a non-polarity-sensitive gas filled diode requiring a specific firing potential for detecting a desired voltage directly connected between the junction of said resistor and capaictor and one side of said parallel circuit, the other side of said parallel circuit connected to ground, said gas filled diode firing when said capacitor is charged to said specific firing potential and the polarity of said charge determining which of the switches will be actuated as differentiated by said unidirectional diodes.

(References on following page)

References Cited by the Examiner

UNITED STATES PATENTS

| | | | |
|---|---|---|---|
| 2,071,984 | 2/37 | Minneci | 317—123.7 X |
| 2,093,854 | 9/37 | Swart | 324—122 X |
| 2,157,690 | 5/39 | Clough | 317—137 X |
| 2,352,742 | 7/44 | Soffel | 340—147 X |
| 2,424,243 | 7/47 | Lowell | 317—137 |
| 2,433,254 | 12/47 | Aiken | 317—151 |

| | | | |
|---|---|---|---|
| 2,575,279 | 11/51 | Linton | 324—72.5 |
| 2,958,823 | 11/60 | Rabier | 324—132 |
| 3,106,667 | 10/63 | Winchel | 317—151 X |

FOREIGN PATENTS

| | | |
|---|---|---|
| 688,599 | 3/63 | Great Britain. |

SAMUEL BERNSTEIN, *Primary Examiner.*

WALTER L. CARLSON, *Examiner.*